Figure 1:
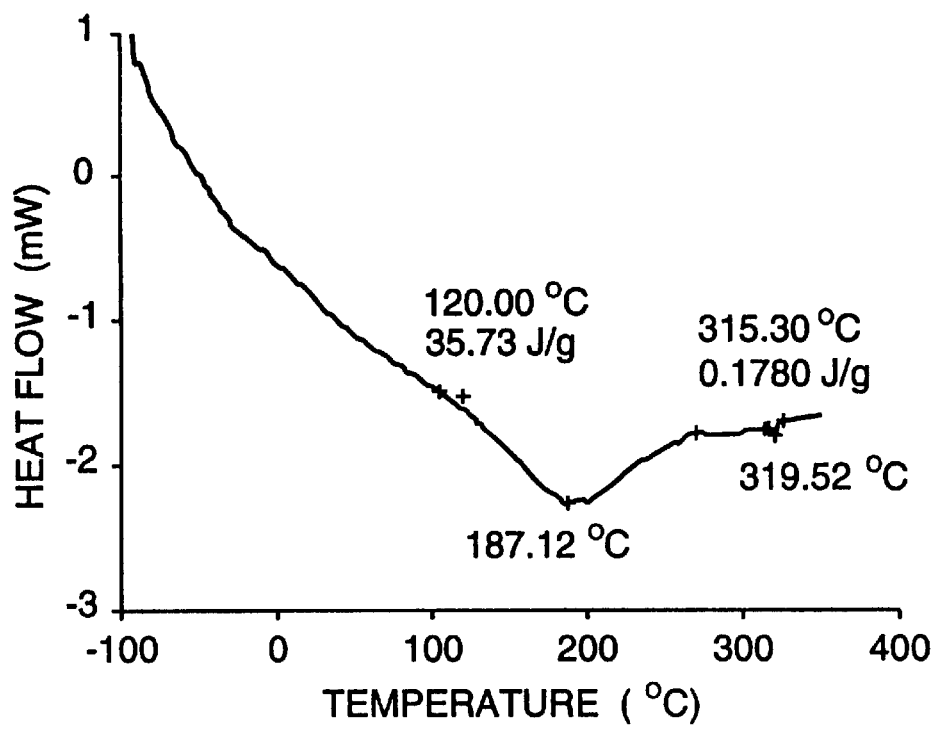

United States Patent [19]
Greuel et al.

[11] Patent Number: 5,877,267
[45] Date of Patent: Mar. 2, 1999

[54] FLUORINE-CONTAINING POLYMERS AND PREPARATION THEREOF

[75] Inventors: Michael P. Greuel, White Bear Lake Township, County of Ramsey; Werner M. Grootaert, Oakdale, both of Minn.

[73] Assignee: Minnesota Mining and Manufacturing Company, St. Paul, Minn.

[21] Appl. No.: 782,465

[22] Filed: Jan. 10, 1997

Related U.S. Application Data

[63] Continuation of Ser. No. 541,224, Oct. 12, 1995, abandoned, which is a continuation of Ser. No. 355,506, Dec. 14, 1994, abandoned.

[51] Int. Cl.$^6$ ............................................. C08F 2/00
[52] U.S. Cl. ................... 526/225; 526/222; 526/247; 526/249; 526/254; 526/255
[58] Field of Search .................................. 526/225, 222, 526/247, 249, 254, 255

[56] References Cited

U.S. PATENT DOCUMENTS

| | | |
|---|---|---|
| 3,859,259 | 1/1975 | Harrell et al. . |
| 3,933,773 | 1/1976 | Foerster . |
| 4,035,565 | 7/1977 | Apotheker et al. . |
| 4,233,421 | 11/1980 | Worm . |
| 4,277,586 | 7/1981 | Ukihashi et al. . |
| 4,287,320 | 9/1981 | Kolb . |
| 4,450,263 | 5/1984 | West . |
| 4,463,144 | 7/1984 | Kojima et al. . |
| 4,558,141 | 12/1985 | Squire . |
| 4,564,662 | 1/1986 | Albin . |
| 4,882,390 | 11/1989 | Grootaert et al. . |
| 5,037,921 | 8/1991 | Carlson . |
| 5,086,123 | 2/1992 | Guenther et al. . |
| 5,281,680 | 1/1994 | Grot ........................................ 526/206 |
| 5,285,002 | 2/1994 | Grootaert ................................. 526/225 |

FOREIGN PATENT DOCUMENTS

| | | | |
|---|---|---|---|
| 2056692 | 11/1991 | Canada . | |
| 1110868 | 7/1961 | Germany ............................... | 526/225 |
| 62-288614 | 12/1987 | Japan ...................................... | 526/225 |
| 291925 | 3/1971 | U.S.S.R. ............................... | 526/225 |
| 840735 | 7/1960 | United Kingdom ................... | 526/225 |
| 919683 | 2/1963 | United Kingdom ................... | 526/225 |
| 1169309 | 11/1969 | United Kingdom ................... | 526/225 |

OTHER PUBLICATIONS

G. K. Kostov et al., "Emulsion Copolymerization of Tetrafluoroethylene and Propylene with Redox System Containing tert–Butylperbenzoate. I. Polymerization Conditions and Components", Journal of Polymer Science: Part A: Polymer Chemistry, 32, 2229–2234 (1994).

P. Chr. Petrov et al., "Emulsion Copolymerization of Tetrafluoroethylene and Propylene with Redox System Containing tert–Butylperbenzoate. II. Polymerization Mechanism", Journal of Polymer Science: Part A: Polymer Chemistry, 32, 2235–2239 (1994).

G. K. Kostov et al., "Study of Synthesis and Properties of Tetrafluoroethylene–Propylene Copolymers", Journal of Polymer Science: Part A: Polymer Chemistry, 30, 1083–1088 (1992).

Gen Kojima and Michio Hisasue, "Die Emulsion scopolymerisation von Tetrafluoroethylen mit Propylen bei niedrigen Temperaturen," Makromolekular Chemic 182, 1981, pp. 1429–1439 (Translation enclosed).

D.E. Hull, et al., "New Type Fluoroelastomer With Improved Chemical Resistance To Automotive Oils and Lubricants," SAE Technical Paper Series, #900121, SAE Publications Division, Warrendale, PA (1990).

D.E. Hull, et al., "New Elastomers are More Resistant to Many Automotive Fluids," SAE Technical Paper Series, #890361, SAE Publications Division, Warrendale, PA (1989).

John Wiley & Sons, Encyclopedia of Polymer Science and Engineering, vol. 13, pp. 714–715 (1988).

George Odian, "Principles of Polymerization," 2nd Ed., pp. 250–251, John Wiley & Sons.

Hu et al. in J. Org. Chem., Vo. 56, No. 8, 1991, p. 2803.

Grootaert et al., "Elastomers Synthetic Fluorocarbon Elastomers," Kirk–Othmer, Encyclopedia of Chemical Technology, Fourth Ed., vol. 8, pp. 990–1005, John Wiley & Sons (1993).

Grootaert et al., "A Novel Fluorocarbon Elastomer For High–Temperature Sealing Applications In Aggressive Moto–Oil Environments," Rubber Chemistry and Technology, vol. 63, pp. 516–522, American Chemical Society (1990).

Kolb et al., "Aging Behavior of Fluorocarbon in Various Motor Oils," Automotive Polymers & Design, vol. 7 (No. 6), pp. 10–13, Lippincott & Peto, Inc. (1988).

Brullo, R.A., "Fluoroelastomer Rubber for Automotive Applications," Automotive Elastomer & Design, Jun. 1985.

Brullo, R.A., "Fluoroelastomer Seal Up Automotive Future," Materials Engineering, Oct. 1988.

F.W. Billmeyer, Jr., Textbook of Polymer Science, 3rd Ed., pp. 398–403, John Wiley & Sons, New York, (1984).

"Fluorinated Elastomers," Kirk–Othmer, Encyclopedia fo Chemical Technology, vol. 8, pp. 500–515, (3rd Ed., John Wiley & Sons, 1979).

"Organic Fluorine Compounds," Kirk–Othmer, Encyclopedia of Chemical Technology, vol. 11, pp. 20, 21, 32, 33, 40, 41, 48, 50, 52, 62, 70, 71, John Wiley & Sons (1980).

Official Gazette—1046 TMOG 2—Sep. 4, 1984.

Primary Examiner—Joseph L. Schofer
Assistant Examiner—N. Sarafin
Attorney, Agent, or Firm—Gary L. Griswold; Walter N. Kirn; Lucy C. Weiss

[57] ABSTRACT

A method for polymerizing fluorine-containing ethylenically-unsaturated monomer and allylic-hydrogen containing olefin monomer is provided. The method involves the use of fluoroaliphatic-group containing sulfinate. Novel polymers are also disclosed, comprising interpolymerized units derived from tetrafluoroethylene and allylic-hydrogen containing olefin, for example, propylene.

10 Claims, 3 Drawing Sheets

FLUORINE-CONTAINING POLYMERS AND PREPARATION THEREOF

This is a continuation of application Ser. No. 08/541,224 filed Oct. 12, 1995, abandoned which was a continuation of U.S. Ser. No. 08/355,506, filed Dec. 14, 1994, now abandoned.

This invention relates to fluorine-containing polymers, their preparation and use. In another aspect, this invention relates to methods of free-radical polymerization of monomer mixtures comprising a fluorine-containing ethylenically-unsaturated monomer and an allylic-hydrogen containing olefin monomer, and to the resulting polymers and shaped articles thereof.

Fluorine-containing polymers, or fluoropolymers, are an important class of polymers and include for example, amorphous fluorocarbon elastomers and semi-crystalline fluorocarbon plastics. Within this class are polymers of high thermal stability and usefulness at high temperatures, and extreme toughness and flexibility at very low temperatures. Many of these polymers are almost totally insoluble in a wide variety of organic solvents, and are chemically inert. Some have extremely low dielectric loss and high dielectric strength, and most have unique nonadhesive and low-friction properties. See, for example, F. W. Billmeyer, *Textbook of Polymer Science*, 3rd ed., pp. 398–403, John Wiley & Sons, New York (1984).

Amorphous fluorocarbon elastomers, particularly the copolymers of vinylidene fluoride with other ethylenically unsaturated halogenated monomers, such as hexafluoropropene, have particular utility in high temperature applications, such as seals, gaskets, and linings - see, for example, Brullo, R. A., "Fluoroelastomer Rubber for Automotive Applications," *Automotive Elastomer & Design*, June 1985, "Fluoroelastomer Seal Up Automotive Future," *Materials Engineering*, October 1988, and "Fluorinated Elastomers," Kirk-Othmer, *Encyclopedia of Chemical Technology*, Vol. 8, pp. 500–515 (3rd ed., John Wiley & Sons, 1979).

Semi-crystalline fluoroplastics, particularly polychlorotrifluoroethylene, polytetrafluoroethylene, copolymers of tetrafluoroethylene and hexafluoropropylene, and poly(vinylidene fluoride), have numerous electrical, mechanical, and chemical applications. Fluoroplastics are useful, for example, in wire coatings, electrical components, seals, solid and lined pipes, and pyroelectric detectors. See, for example, "Organic Fluorine Compounds," Kirk-Othmer, *Encyclopedia of Chemical Technology*, Vol. 11, pp. 20, 21, 32, 33, 40, 41, 48, 50, 52, 62, 70, 71, John Wiley & Sons, (1980).

Fluorine-containing polymers can be prepared by free-radical initiated polymerization of one or more fluorine-containing ethylenically unsaturated monomers. Free radicals are typically formed by the decomposition of a free-radical initiator. Free-radical initiators may be decomposed by light, heat, high energy radiation, or as a result of oxidation-reduction reactions. When free radicals are generated in the presence of free-radical polymerizable ethylenically unsaturated monomers, a chain reaction occurs producing polymer. The polymer can be prepared by polymerization of monomers in bulk, in solution, in emulsion, or in suspension. Fluoroelastomers and fluoroplastics are preferably prepared by aqueous emulsion or suspension polymerization because of the rapid and nearly complete conversion of monomers, easy removal of the heat of polymerization and ready isolation of the polymer. Emulsion or suspension polymerization typically involves polymerizing monomers in an aqueous medium in the presence of an inorganic free-radical initiator system, and surfactant or suspending agent.

Copolymers of tetrafluoroethylene ("TFE") and propylene, and terpolymers of TFE, propylene, and vinylidene fluoride are known and useful polymers. See, e.g., D. E. Hull et al., "New Elastomers are More Resistant to Many Automotive Fluids," *SAE Technical Paper Series*, #890361, SAE Publications Division, Warrendale, Pa., (1989), D. E. Hull et al., "New Type Fluoroelastomers With Improved Chemical Resistance to Automotive Oils and Lubricants," *SAE Technical Paper Series*, #900121, SAE Publications Division, Warrendale, Pa., (1989), Grootaert et al., "Elastomers, Synthetic Fluorocarbon Elastomers," Kirk-Othmer, *Encyclopedia of Chemical Technology*, Fourth Ed., Vol. 8, pp. 990–1005, John Wiley & Sons, (1993), Grootaert et al., "A Novel Fluorocarbon Elastomer For High-Temperature Sealing Applications In Aggressive Motor-Oil Environments," *Rubber Chemistry and Technology*, Volume 63, pp. 516–522, American Chemical Society (1990), and Kolb et al., "Aging Behavior of Fluorocarbon in Various Motor Oils," *Automotive Polymers & Design*, Volume 7 (No. 6), pp. 10–13, Lippincott & Peto, Inc. (1988). However, their manufacture has been known to be difficult, particularly with respect to the preparation of amorphous polymers derived from TFE and propylene. Various patents describe processes to make these polymers.

U.S. Pat. No. 3,859,259 (Harrel et al.) prepares certain amorphous copolymers of TFE and propylene by a continuous aqueous emulsion polymerization process at high pressure (preferably about 500 to 1,500 psig) using ammonium persulfate as initiator and sodium lauryl sulfate as the emulsifier.

U.S. Pat. No. 5,037,921 (Carlson) prepares certain fluoroelastomer copolymers of TFE and propylene by a semi batch, emulsion polymerization process in the presence of diiodo chain transfer agents. The polymerizations are preferably run at temperatures of 70° C. to 90° C. and preferably at pressures of 2.6 to 2.7 MPa (380 to 400 psig).

U.S. Pat. No. 3,933,773 (Foerster) prepares certain thermoplastic elastomeric copolymers of TFE and propylene by an emulsion polymerization reaction utilizing a redox initiator system at a pressure of 100 to 1,000 psig, preferably 250 to 350 p.s.i.g.

It is generally believed that one important problem in these polymerizations is degradative chain transfer reactivity of alpha-olefins containing an allylic hydrogen, e.g., propylene. See, e.g., *Encyclopedia of Polymer Science and Engineering*, Volume 13, pp. 714–715, John Wiley & Sons (1988), and George Odian, Principles of Polymerization, 2nd Ed., pp. 250–251, John Wiley & Sons. This degradative chain transfer is thought to be due to the weakness of the allylic carbon-hydrogen bond. For example, in propylene polymerizations, it is thought that a propylene molecule reacts with a propagating polymer-chain radical through transfer of its allylic hydrogen instead of through its double bond thus leading to low polymerization rates and resulting in polymers with low molecular weight. The formed allyl radical is resonance stabilized and unable to initiate a new polymerization.

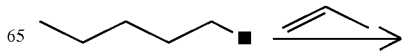

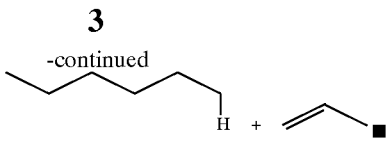

This reaction is also believed to be temperature dependent, and the polymerization rate is expected to decrease at higher temperatures. Therefore a great deal of effort has been put into development of low temperature redox initiating systems that would allow fast reaction rates and high molecular weight copolymers. Note that other monomers such as methyl methacrylate and methacrylonitrile, which also contain allylic carbon-hydrogen bonds, do not under go extensive degradative chain transfer because the ester or nitrile substituents are believed to stabilize the propagating radicals and decrease their reactivity toward transfer compared to olefins.

U.S. Pat. No. 4,277,586 (Ukihashi et al.) discloses a method for the low temperature (0°–50° C.) polymerization of TFE and propylene. The patent states in Col. 1 that "propylene-tetrafluoroethylene copolymers prepared by the conventional processes are characterized by low molecular weight . . . " In the method of the '586 patent "When the reaction temperature is above 50° C., the molecular weight of the copolymer will be decreased and the Mooney viscosity of the copolymer will be increased." (Col. 3, line 68, and Col. 4, lines 1–3). See also, G. Kojima and M. Hisasue, "Die Emulsionscopolymerisation von Tetrafluoroethylen mit Propylen bei niedrigen Temperaturen," *Makromol. Chem., Vol. 182*, pp. 1429–1439 (1981).

In U.S. Pat. No. 4,463,144 (Kojima et al.) this process was improved by means of an initiating system comprising a water soluble persulfate, a water soluble iron salt, a hydroxymethanesulfinate, and ethylenediaminetetraacetic acid or a salt thereof, in an alkaline aqueous solution containing a specific amount of tertiary butanol and an emulsifier at pH of up to 10.5. The tertiary butanol is said to act as an accelerator and "If the amount of tertiary butanol is less than 5 wt.%, no adequate effects are obtainable." (Col. 4, lines 5–7).

U.S. Pat. No. 5,285,002 (Grootaert) discloses the preparation of fluorine-containing polymers by polymerizing an aqueous emulsion or suspension of a polymerizable mixture comprising fluoroaliphatic-group containing sulfinate.

Briefly, in one aspect, the present invention provides a method for the preparation of fluorine-containing polymer comprising polymerizing, under free-radical conditions, an aqueous emulsion or suspension of a polymerizable mixture comprising a fluorine-containing ethylenically-unsaturated monomer, an allylic-hydrogen containing olefin monomer, e.g., propylene, a fluoroaliphatic-group containing sulfinate, and an oxidizing agent capable of oxidizing said sulfinate to a sulfonyl radical.

In another aspect, this invention provides semi-crystalline copolymers comprising interpolymerized units derived from TFE and allylic-hydrogen containing olefin monomer, e.g., propylene, wherein less than 10%, preferably less than 5%, of the total heat of fusion is attributable to a secondary melt-transition above 300° C. as shown by the heating curve from Differential Scanning Calorimetry (DSC). The resulting polymers possess improved processing compared to prior art polymers, particularly at low processing temperatures.

We have found that with the use of the initiating system disclosed in U.S. Pat. No. 5,285,002, supra, both redox and thermal initiation is possible for monomer mixtures containing fluorine-containing monomers and allylic-hydrogen containing monomers. Compared to prior art processes, particularly in the preparation of amorphous polymers, the process of the present invention does not require cosolvents such as tertiary butanol, can be run smoothly at relatively low pressures, and proceeds at relatively rapid reaction rates. The polymers obtained are of usable molecular weight as indicated by their viscosity or melt-flow index (MFI) which are in the range of viscosities or MFI generally seen in commercially useful polymers, and are clean colorless polymers. Furthermore, there is no evidence of the degradative chain transfer, even when polymerized at elevated temperatures such as 71° C., as evidenced by the absence of a detectable $CF_2H$ resonance in the proton NMR.

A class of the fluoroaliphatic sulfinates useful in this invention can be represented by the following general formulae

or

wherein $R_f$ represents a monovalent fluoroaliphatic group having, for example, from 1 to 20 carbon atoms, preferably 4 to 10 carbon atoms, $R_f'$ represents a polyvalent, preferably divalent, fluoroaliphatic group having, for example, from 1 to 20 carbon atoms, preferably from 2 to 10 carbon atoms, M represents a hydrogen atom or cation with valence x, which is 1 to 2, and is preferably 1, n is 2 to 4, preferably 2.

The monovalent fluoroaliphatic group, $R_f$, is a fluorinated, stable, inert, non-polar, saturated moiety. It can be straight chain, branched chain, and, if sufficiently large, cyclic, or combinations thereof, such as alkyl cycloaliphatic groups. Generally, $R_f$ will have 1 to 20 carbon atoms, preferably 4 to 10, and will contain 40 to 83 weight percent, preferably 50 to 78 weight percent fluorine. The preferred compounds are those in which the $R_f$ group is fully or substantially completely fluorinated, as in the case where $R_f$ is perfluoroalkyl, $C_nF_{2n+1}$, where n is 1 to 20.

The polyvalent, preferably divalent, fluoroaliphatic group, $R_f'$, is a fluorinated, stable, inert, non-polar, saturated moiety. It can be straight chain, branched chain, and, if sufficiently large, cyclic or combinations thereof, such as alkyl cycloaliphatic divalent groups. Generally, $R_f'$, will have 1 to 20 carbon atoms, preferably 2 to 10. Examples of preferred compounds are those in which the $R_f'$ group is perfluoroalkylene, $C_nF_{2n}$, where n is 1 to 20, or perfluorocycloalkyl, $C_nF_{2n-2}$, where n is 5 to 20.

With respect to either $R_f$ or $R_f'$, the skeletal chain of carbon atoms can be interrupted by divalent oxygen, hexavalent sulfur or trivalent nitrogen hetero atoms, each of which is bonded only to carbon atoms, but preferably where such hetero atoms are present, such skeletal chain does not contain more than one said hetero atom for every two carbon atoms. An occasional carbon-bonded hydrogen atom, iodine, bromine, or chlorine atom may be present; where present, however, they preferably are present not more than one for every two carbon atoms in the chain. Where $R_f$ or $R_f'$ is or contains a cyclic structure, such structure preferably has 6 ring member atoms, 1 or 2 of which can be said hetero atoms, e.g., oxygen and/or nitrogen. Examples of $R_f$ groups are fluorinated alkyl, e.g., $C_4F_9$—, $C_6F_{13}$—, $C_8F_{17}$—, alkoxyalkyl, e.g., $C_3F_7OCF_2$—. Examples of $R_f'$ are fluorinated alkylene, e.g., —$C_4F_8$—, —$C_8F_{16}$—. Where $R_f$ is designated as a specific group, e.g., $C_8F_{17}$—, it should be understood that this group can represent an average structure of a mixture, e.g., $C_6F_{13}$— to $C_{10}F_{21}$—, which mixture can also include branched structures.

Representative fluoroaliphatic sulfinate compounds useful in the practice of this invention include the following:

$CF_3SO_2Na$ $C_4F_9SO_2H$ $C_4F_9SO_2Na$ $C_6F_{13}SO_2Na$ $C_8F_{17}SO_2Na$ $CF_3C(Cl)_2CF_2SO_2K$ $Cl(CF_2)_8OC_2F_4SO_2Na$ $Cl(CF_2)_xCF_2SO_2Na$ where x is 1 to 10

$NaO_2SC_8F_{16}SO_2Na$ $NaO_2SC_6F_{12}SO_2Na$ $NaO_2SC_2F_4OC_2F_4SO_2Na$ $NaO_2SC_2F_4OC_2F_4X$, where X is Br or I $NaO_2S(C_4F_8O)_nC_3F_6SO_2Na$ where n is 1 to 20

$NaO_2SCF_2O(CF_2CF_2O)_m(CF_2O)_nCF_2SO_2Na$ where n and m are each 1 to 20

$(CF_3)_2NCF_2CF_2SO_2Na$ $(C_2F_5)_2NCF_2CF_2SO_2Na$ $N(C_2F_4SO_2Na)_3$ $NaO_2SC_8F_{16}SO_2F$ $NaO_2SC_3F_6O(C_4F_8O)_nC_3F_6SO_2Na$ where n is 4 to 8

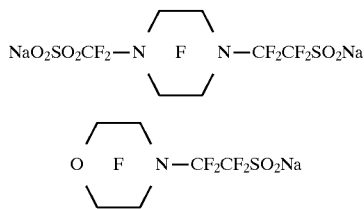

Suitable fluorine-containing ethylenically-unsaturated monomers for use in this invention include the terminally unsaturated mono-olefins typically used for the preparation of fluorine-containing polymers such as vinylidene fluoride, hexafluoropropene, chlorotrifluoroethylene, 2-chloropentafluoropropene, perfluoroalkyl vinyl ethers, e.g., $CF_3OCF=CF_2$ or $CF_3CF_2CF_2OCF=CF_2$, tetrafluoroethylene, 1-hydropentafluoropropene, 2-hydropentafluoropropene, dichlorodifluoroethylene, trifluoroethylene, 1,1-dichlorofluoroethylene, vinyl fluoride, and mixtures thereof. Perfluoro-1,3-dioxoles may also be used. The perfluoro-1,3-dioxole monomers and their copolymers are described, for example, in U.S. Pat. No. 4,558,141 (Squire). Certain fluorine-containing di-olefins are also useful, such as, perfluorodiallylether and perfluoro-1,3-butadiene.

A class of the allylic-hydrogen containing olefin monomers useful in this invention are those mono-olefins which contain only carbon, hydrogen, and halogen atoms. Suitable allylic-hydrogen containing olefin monomers useful in the method of this invention include propylene, butylene, isobutylene, and 1,1,2-trifluoropropene.

The monomer mixtures useful in this invention may also contain additional ethylenically unsaturated comonomers, e.g., ethylene or butadiene. Said monomer mixtures may also contain iodine- or bromine-containing cure-site comonomers in order to prepare peroxide curable polymers, e.g., fluoroelastomers. Suitable cure-site monomers include terminally unsaturated mono-olefins of 2 to 4 carbon atoms such as bromodifluoroethylene, bromotrifluoroethylene, iodotrifluoroethylene, $CF_2=CFOCF_2CF_2Br$, and 4-bromo-3,3,4,4-tetrafluorobutene-1.

The method of this invention can comprise otherwise conventional emulsion or suspension free-radical polymerization techniques. Such conventional emulsion or suspension polymerization techniques typically involve polymerizing monomers in an aqueous medium in the presence of an inorganic free-radical initiator system and surfactant or suspending agent. In one aspect, the method of this invention comprises the use of fluorinated sulfinate as a reducing agent and a water soluble oxidizing agent capable of converting the sulfinate to a sulfonyl radical. Preferred oxidizing agents are sodium, potassium, and ammonium persulfates, perphosphates, perborates, and percarbonates. Particularly preferred oxidizing agents are sodium, potassium, and ammonium persulfates. The sulfonyl radical so produced is believed to eliminate $SO_2$, forming a fluorinated radical that initiates the polymerization of the monomers.

In addition to the sulfinate, other reducing agents can be present, such as sodium, potassium or ammonium sulfites, bisulfite, metabisulfite, hyposulfite, thiosulfite, phosphite, sodium or potassium formaldehyde sulfoxylate or hypophosphite. Activators such as ferrous, cuprous, and silver salts, may also be present.

Aqueous emulsion and suspension polymerizations can be carried out under conventional steady-state conditions in which, for example, monomers, water, surfactants, buffers and catalysts are fed continuously to a stirred reactor under optimum pressure and temperature conditions while the resulting emulsion or suspension is removed continuously. An alternative technique is batch or semibatch polymerization by feeding the ingredients into a stirred reactor and allowing them to react at a set temperature for a specified length of time or by charging ingredients into the reactor and feeding the monomer into the reactor to maintain a constant pressure until a desired amount of polymer is formed.

The amount of fluoroaliphatic sulfinate used can vary, depending, for example, on the molecular weight of polymer desired. Preferably the amount of fluoroaliphatic sulfinate is from 0.01 to 50 mole %, and most preferably from 0.05 to 10 mole %, of sulfinate compound based on total quantity of monomers.

Combinations of monosulfinates, disulfinates, and trisulfinates can be used, depending on whether it is desired to use sulfinate as an initiator, a monomer, or both. When polyvalent sulfinates, such as those represented by Formula II, are used, the sulfinate is believed to act as a monomer and the fluorinated moiety is believed to be incorporated into the polymer backbone. When monosulfinates are used the fluorinated moiety is believed to be incorporated as a polymer end group.

Polymers prepared by the method of this invention, such as amorphous fluoroelastomers, can be compounded and cured using conventional methods. Such polymers are often cured by nucleophiles such as diamines or polyhydroxy compounds. For example, certain fluoroelastomers prepared by the method of this invention may be crosslinked with aromatic polyhydroxy compounds, such as bisphenols, which are compounded with the polymer along with a curing accelerator, such as a quaternary phosphonium salt, and acid acceptors, such as magnesium oxide and calcium hydroxide. Particularly useful polyhydroxy compounds include 4,4'-thiodiphenol, isopropylidene-bis(4-hydroxybenzene), and hexafluoroisopropylidene-bis(4-hydroxybenzene) ("bisphenol AF") which are described, for example, in U.S. Pat. No. 4,233,421 (Worm). Such crosslinking methods are described, for example, in U.S. Pat. Nos. 4,287,320 (Kolb), 4,882,390 (Grootaert et al.), 5,086,123 (Guenthner et al.), and Canadian Patent 2056692 (Kruger et al.).

Certain polymers may be cured with peroxides. A cure-site monomer susceptible to free-radical attack is generally required to render polymers peroxide- curable. For example, polymers which contain interpolymerized units derived from iodine- or bromine-containing monomers are often peroxide-curable. Such cure-site monomers are described, for example, in U.S. Pat. Nos. 4,035,565 (Apotheker et al.), 4,450,263 (West), 4,564,662 (Albin), and Canadian Pat. Application No. 2,056,692 (Kruger et al.)

The semi-crystalline polymers of this invention comprise interpolymerized units derived from TFE and an allylic-hydrogen containing olefin monomer. The semi-crystalline polymers of this invention differ from those of the prior art in that they exhibit a much smaller, high-temperature melt-peak. This is demonstrated by DSC curves which show that in the polymers of this invention less than 10%, preferably less than 5%, most preferably less than 3%, of the total heat of fusion is attributable. to a secondary melt-transition above 300° C. The semi-crystalline polymers of this invention possess improved processing compared to prior art polymers, particularly at low processing temperatures, i.e., at or below 300° C.

Fillers can be mixed with the polymers of this invention to improve molding characteristics and other properties. When a filler is employed, it can be added in amounts of up to about 100 parts per hundred parts by weight of polymer, preferably between about 15 to 50 parts per hundred parts by weight of the polymer. Examples of fillers which may be used are thermal-grade carbon blacks, or fillers of relatively low reinforcement characteristics such as clays and barytes.

The sulfinate compounds useful in this invention result in polymers which have non-polar, non-ionic end groups. These non-ionic end groups generally result in improved properties such as improved thermal stability and improved rheological behavior. Polymers with non-ionic end groups exhibit lower apparent viscosities during processing, e.g. injection molding, when compared at the same shear rates to polymers with ionic end groups. The resulting polymers may be elastomers or plastics. The polymers may be shaped to form useful articles including O-rings, fuel-line hoses, shaft seals, and wire insulation.

EXAMPLES

In the following Examples and Comparative Examples polymers were prepared. The average reaction rates were observed and calculated in grams of total monomer consumed per liter of water (or water and cosolvent mixture) charged to the reactor per hour ("g/l-h").

Mooney Viscosities of polymers were measured at 121° C. according to ASTM D 1646-81, using a Monsanto Mooney Viscometer model MV 2000, a large rotor, 1 minute preheat, and measurement after 10 minutes ("ML 1+10@ 121° C.").

MFI for polymers were obtained under the conditions described in the Examples and Comparative Examples using the methodology described in ASTM D-1238 using a Tinius Olsen extrusion plastometer.

Thermal analysis was performed using a TA Instruments DSC-2910 and 2000-series controller equipped with an LNCA-II controlled cooling accessory. Heating curves were obtained under nitrogen purge by equilibrating samples at −100° C., holding isothermal for 1 minute, heating to 350° C. at a heating rate of 10° C. per minute, slowly cooling back to −100° C. under the "equilibrating segment" of the equipment software, and heating again to 350° C. at a heating rate of 10° C. per minute. Heating curves shown in all of the Figures are from the second heating cycle.

Unless otherwise indicated, all % are by weight.
Preparation of sulfinates

Fluorochemical sulfinates can be prepared by deiodosulfination of the corresponding iodides following the general procedure of Hu et al. in J. Org. Chem., Vol. 56, No. 8, 1991, page 2803. The fluorochemical sulfinates $C_4F_9SO_2Na$ and $C_6F_{13}SO_2Na$ were prepared by reduction of the corresponding sulfonyl fluorides $C_4F_9SO_2F$ and $C_6F_{13}SO_2F$ with $Na_2SO_3$ in a one to one mixture of water and dioxane. See also, U.S. Pat. No. 5,285,002, supra. The purity of these fluorochemical sulfinates, as determined by $^{19}F$ NMR analysis, was about 90%.

EXAMPLE 1

A 19-liter reactor was charged with 13,500 g deionized water, 37.8 g KOH, 81 g ammonium perfluoro octanoate (commercially available from 3M Co. as FLUORAD™ FC 143 fluorochemical), 29.8 g $Na_2SO_3$, 324 g of a 20% solution of perfluorohexyl sodium sulfinate in water, and a solution of 0.56 g $CuSO_4.5H_2O$ in 500 mL deionized water. After repeated vacuum/nitrogen purges, the reactor was heated under agitation (375 rpm) to 54° C. and pressurized to 1.93 MPa (280 psig) with a mixture of 95% TFE and 5% propylene. A 10% solution of ammonium persulfate in deionized water was fed into the reactor through the use of a constametric pump at a rate of 1.2 grams per minute. As soon as the pressure dropped, indicating polymerization, the monomers were replenished at 1.86 MPa (270 psig), in a ratio of 75% TFE and 25% propylene. The reaction proceeded for 5 hours, during which 4,712 g monomer was consumed to give a calculated average reaction rate of 67 g/l-h. At this time the feed of ammonium persulfate solution was halted, which stopped the reaction within 2 minutes. The excess monomer was vented, and a white latex was drained from the reactor and the polymer was coagulated by dripping into a solution of magnesium chloride in water, followed by washing and drying, to yield a white rubbery polymer. The Mooney viscosity (ML 1+10@ 121° C.) was 71.

EXAMPLE 2

A 19-liter reactor was charged with 14,000 g deionized water, 50 g $K_2HPO_4$, 9 g KOH, 81 g ammonium perfluoro octanoate, and 324 g of a 20% solution of perfluorohexyl sodium sulfinate in deionized water. After repeated vacuum/nitrogen purges, the reactor was heated to 71° C. under agitation (445 rpm), and pressured to 2.07 MPa (300 psig) with a mixture of 50% TFE, 5% propylene, and 45% vinylidene fluoride. A 10% solution of ammonium persulfate in deionized water was fed into the reactor using a constametric pump at a rate of 3 grams per minute. As soon as the pressure dropped, the monomers were replenished with 55% TFE, 15% propylene, and 30% vinylidene fluoride. After 600 g of the ammonium persulfate solution was added, this feed was stopped and the reaction allowed to continue. In a total of 7 hours, 3,848 g of monomers were consumed to give a calculated average reaction rate of 39 g/l-h. The reactor was cooled and excess monomer was vented. A white latex was obtained and was worked up as in Example 1 to yield a rubbery polymer with a Mooney viscosity (ML 1+10@ 121° C.) of 28.

EXAMPLE 3

A 150-liter enamel-lined reactor was charged with 105 kg deionized water, 2,024 g of a 20% solution of ammonium perfluoro octanoate in deionized water, 284 g KOH, 223 g $Na_2SO_3$, 4.2 g $CuSO_4.5H_2O$, and 1,472 g of a 25% solution perfluoro butyl sodium sulfinate in deionized water. After repeated vacuum/nitrogen purges, the reactor contents were heated under agitation (210 rpm) to 54° C. and the reactor was pressured with a mixture of 84.9% TFE, 12.1% vinylidene fluoride, and 3.0% propylene to a pressure of 1.59 MPa (230 psig). A 10% solution of ammonium persulfate in deionized water was fed to the reactor at a rate of 400 g per hour and as soon as the pressure dropped, the monomer was replenished with a mixture of 71% TFE, 22% propylene, and 7% vinylidene fluoride as to maintain a constant pressure of 1.59 MPa (230 psig). After 5.75 hours, a total of 30 kg of monomer was consumed to give a calculated average reaction rate of 50 g/l-h. The initiator feed was stopped and the excess monomer was vented. The 22.7% solids latex was drained from the reactor and the polymer was coagulated by dripping into a solution of magnesium chloride in water, followed by washing and drying, to yield a rubbery polymer. The Mooney viscosity (ML 1+10@ 121° C.) was 90. The number average molecular weight ($M_n$) determined by NMR spectroscopy was 88,000.(0.17 mole % $C_4F_9$ endgroups).

EXAMPLE 4

A 150-liter enamel-lined reactor was charged with 105 kg deionized water, 2,024 g of a 20% solution of ammonium perfluoro octanoate in deionized water, 68 g KOH, 376 g $K_2HPO_4$, and 1,705 g of a 21% solution of perfluorobutyl sodium sulfinate in deionized water. After repeated vacuum/nitrogen purges the reactor contents were heated under agitation (210 rpm) to 71 degrees centigrade and the reactor was pressured to 1.59 MPa (230 psig) with 83.8% TFE, 3.2% propylene, and 13% vinylidene fluoride. A 10% solution of ammonium persulfate in water was fed to the reactor at a rate of 1.4 kg per hour, and as soon as the pressure dropped, the monomers were replenished with 71% TFE, 22% propylene, and 7% vinylidene fluoride as to maintain constant pressure of 1.59 MPa (230 psig). After 3.2 kg of the ammonium persulfate solution had been fed, this feed was halted and the reaction was continued. After 5.8 hours, a total of 30 kg of monomer was consumed to give a calculated average reaction rate of 49 g/l-h. The reactor was cooled and excess monomer was vented. The 22.5% solids polymer latex was isolated and worked up as in Example 1. A white rubbery polymer was isolated with a Mooney viscosity (ML 1+10@ 121° C.) of 65. The number average molecular weight ($M_n$) determined by NMR spectroscopy was 91,000 (0.16 mole % $C_4F_9$ end-groups).

EXAMPLE 5

A 19-liter reactor vessel was charged with 14,000 g deionized water, 50 g $K_2HPO_4$ buffer, 9 g KOH, 81 g FC-143 emulsifier, and 324 g of a 20% solution of perfluorohexyl sodium sulfinate in water. Under agitation (445 rpm) the reactor was heated to 71° C. and pressurized to 2.00 MPa (290 psig) with a mixture of 95% TFE and 5% propylene. Using a constametric pump, a 10% solution of ammonium persulfate in water was fed to the reactor at a rate of 135 g per hour. When the pressure dropped, indicating reaction, the monomers were replenished in a mixture of 75% TFE and 25% propylene to maintain 2.00 MPa (290 psig). After 389 g of the ammonium persulfate solution was added, this feed was stopped and the reaction continued thermally until a total of 4000 g of monomer was consumed. This was achieved 4 hours and 45 minutes after the reaction started to give a calculated average reaction rate of 60 g/l-h. At that time, the agitation was decreased and the reactor was cooled and vented. The reactor was drained and a highly transparent latex was obtained. The latex was coagulated by dripping into a magnesium chloride solution in water, to yield a snow-white elastomer gum which was washed several times with hot deionized water and dried overnight at 110° C. There was obtained a snow-white elastomer gum with a Mooney viscosity (ML 1+10@ 121° C.) of 25.

Comparative Example C1

Polymer was prepared as in Example 5, but with omission of the perfluorohexyl sodium sulfinate and all the ammonium persulfate was batch charged at the beginning instead of pumping it in over time. The polymerization was extremely slow and the polymerization was abandoned after 3 hours. Only 368 g of monomer was consumed over this time to give a calculated average reaction rate of 9 g/l-h.

Comparing Examples 1–5 with Comparative Example C1 illustrates the effect of the perfluoro alkyl sulfinate. In Examples 1–5, in which perfluoro alkyl sulfinate was used, the reaction proceeded rapidly. In Comparative Example C1, even with batch charging the persulfate, the rate was much slower than in Examples 1–5. Note that the rate in Comparative Example C1 would have been even slower if the persulfate had been charged over time as in Examples 1–5, rather than batch charged.

EXAMPLE 6

A 19-liter vertically-stirred polymerization reactor was charged with 14,000 g deionized water, 9 g KOH, 50 g $K_2HPO_4$, 81 g ammonium perfluoro octanoate, and 162 g of a 20% solution of $C_6F_{13}SO_2Na$ in deionized water. The reactor was then alternately evacuated and purged with $N_2$ until $O_2$ level is less than 50 ppm. The reactor was then evacuated, the temperature raised to 71° C., and the agitation set at 445 rpm. Next, the reactor was charged with 455 g of TFE and 8.26 g of propylene to give a pressure of 1.52 MPa (220 psig). The polymerization was initiated by feeding a 5% solution of $(NH_4)_2S_2O_8$, in deionized water to the reactor by means of a metering pump at approximately 4 g/min until 1 equivalent of $(NH_4)_2S_2O_8$ was fed (approximately 370 g of soln.). Upon the observation of a pressure drop, the running feed, which consisted of 93% TFE and 7% propylene, was started and continuously adjusted by the reactor's control system in order to maintain the desired pressure. The polymerization was halted by slowing the agitation to 60 rpm after 3,784 g of TFE and 278 g of propylene had been fed, 4 hours after start of running feed to give a calculated average reaction rate of 73 g/l-h. The reactor was then vented, cooled, and drained to isolate the latex. The resulting polymer was isolated by freeze coagulation, washed six times with hot deionized water, and dried overnight in an oven at 100° C. The polymer, when analyzed by DSC, exhibited a broad melting transition with a peak melting temperature of 187° C. and a small secondary melt-transition with a peak melting-temperature of 320° C. which integration of the large and small melt-peaks shows accounts for 0.5% of the total heat of fusion (see FIG. 1). Elemental analysis of the polymer for carbon, hydrogen, and fluorine, indicated a polymer composition of 92.3% TFE and 7.7% propylene. The Melt Flow Index (MFI) of the polymer was determined to be 13 g/10 min. @ 265° C. and 2.5 kg applied load.

EXAMPLE 7

Figure 2:
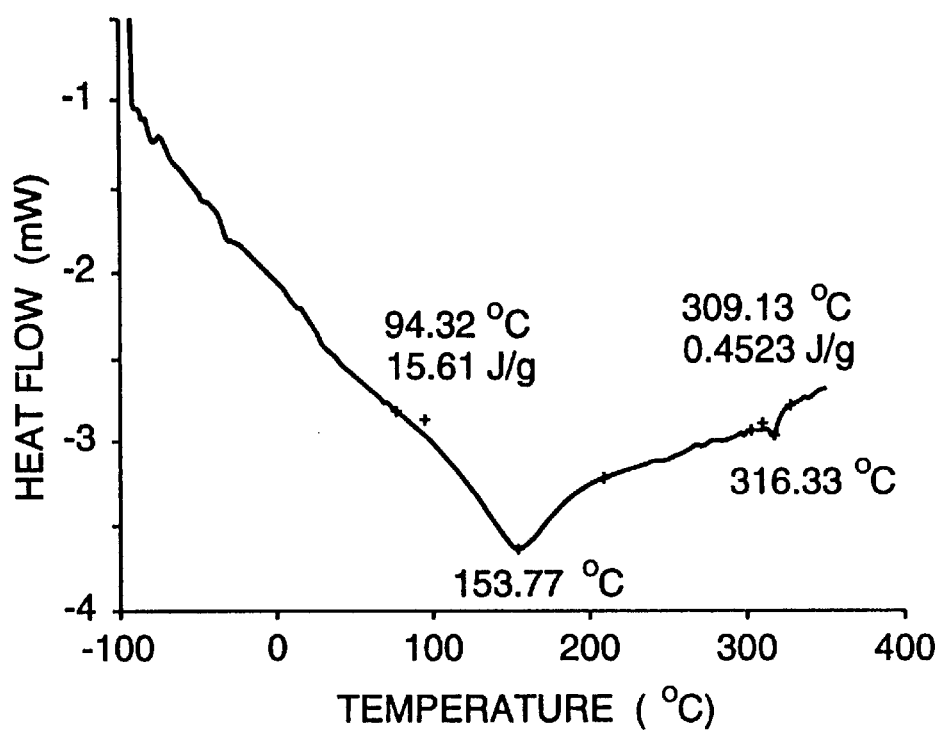

A 150-liter vertically-stirred polymerization reactor was charged with 120,000 g deionized water, 78 g KOH, 430 g $K_2HPO_4$, 694 g ammonium perfluoro octanoate, and 1,023 g of a 20% solution of $C_4F_9SO_2Na$ in deionized water. The reactor was then alternately evacuated and purged with $N_2$ until $O_2$ level is less than 50 ppm. The reactor was then evacuated, the temperature raised to 71° C., and the agitation set at 210 rpm. Next, the reactor was charged with 3929 g of TFE and 79 g of propylene to give a pressure of 15.2 bar (220 psig). The polymerization was initiated by feeding a 5% solution of $(NH_4)_2S_2O_8$ in deionized water to the reactor by means of a metering pump at approximately 25 g/min until 1 equivalent of $(NH_4)_2S_2O_8$ was fed (approximately 3,200 g of solution). Upon the observation of a pressure drop, the running feed, which consisted of 91% TFE and 9% propylene, was started and continuously adjusted by the reactor's control system in order to maintain the desired pressure. The polymerization was halted by slowing the agitation after 31,300 g of TFE and 3,080 g of propylene had been fed, 5 hours after start of running feed to give a calculated average reaction rate of 57 g/l-h. The reactor was then vented, cooled, and drained to isolate the latex. The resulting polymer was coagulated by adding HCl to the latex, granulated, washed six times with deionized water, and dried overnight in an oven at 120° C. The polymer, when analyzed by DSC, exhibited a broad melting transition with a peak melting temperature of 154° C. and a small secondary melt-transition with a peak melting-temperature of 316° C. which integration of the large and small melt-peaks shows accounts for 2.8% of the total heat of fusion (see FIG. 2). Elemental analysis of the polymer for carbon, hydrogen, and fluorine, indicated a polymer composition of 90.9% TFE and 9.1% propylene. The Melt Flow Index (MFI) of the polymer was determined to be 3.3 g/10 min. @ 265° C. and 2.16 kg applied load.

EXAMPLE 8

Figure 3:
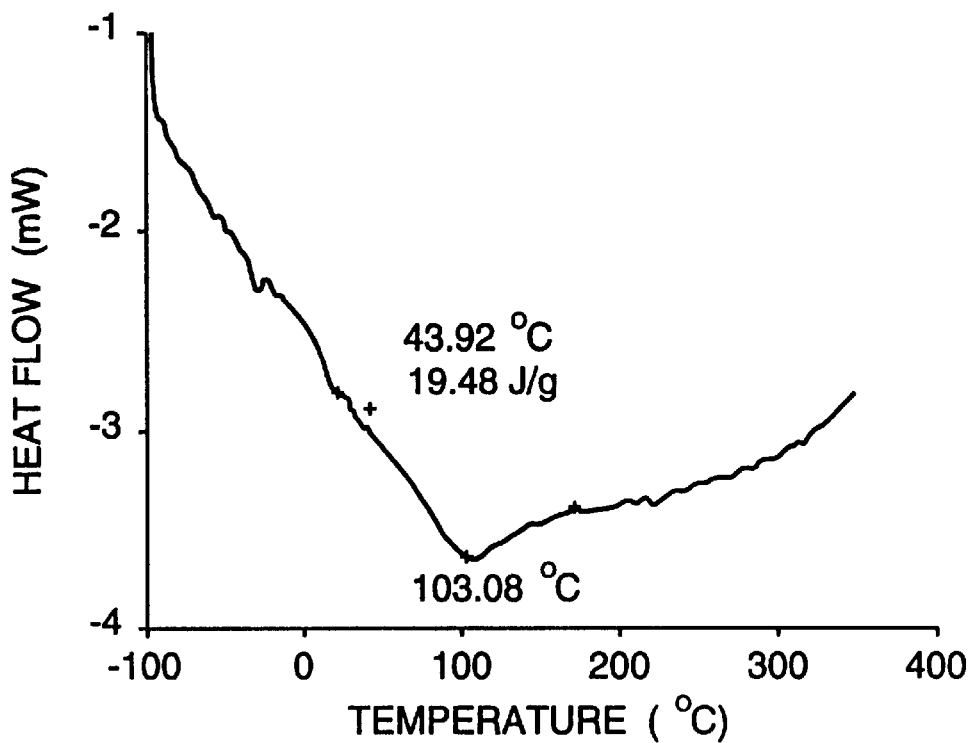

An 86-liter vertically-stirred polymerization reactor was charged with 52,000 g deionized water, 140 g KOH, 300 g ammonium perfluoro octanoate, 110 g $Na_2SO_3$, 2 g $CuSO_4.5H_2O$, and 1,000 g of a 20% solution of $C_6F_{13}SO_2Na$ in deionized water. The reactor was then alternately evacuated and purged with $N_2$ until $O_2$ level is less than 50 ppm. The reactor was then evacuated, the temperature raised to 54° C., and the agitation set at 150 rpm. Next, the reactor was charged with 1256 g of TFE and 37.18 g of propylene to give a pressure of 0.83 MPa (120 psig). The polymerization was initiated by feeding a 10% solution of $(NH_4)_2S_2O_8$, in deionized water to the reactor by means of a metering pump at approximately 3 g/min until 778 g of soln. was fed. Upon the observation of a pressure drop, the running feed, which consisted of 88% TFE and 12% propylene, was started and continuously adjusted by the reactor's control system in order to maintain the desired pressure. The polymerization was halted by slowing the agitation to 30 rpm after 7,825 g of TFE and 1080 g of propylene had been fed, 5 hours after start of running feed to give a calculated average reaction rate of 34 g/l-h. The reactor was then vented, cooled, and drained to isolate the latex. The resulting polymer was isolated by freeze coagulation, washed six times with hot deionized water, and dried overnight in an oven at 100° C. The polymer, when analyzed by DSC, exhibited a broad melting transition with a peak melting temperature of 103° C. and no secondary melt-transition above 300° C. (see FIG. 3). Elemental analysis of the polymer for carbon, hydrogen, and fluorine, indicated a polymer composition of 88.1% TFE and 11.9% propylene. The Melt Flow Index (MFI) of the polymer was determined to be 7 g/10 min. @ 190° C. and 2.5 kg applied load.

Comparative Example C2

A 19-liter vertically-stirred polymerization reactor was charged with 14,000 g deionized water, 9 g KOH, 50 g $K_2HOP_4$, and 81 g ammonium perfluoro octanoate. The reactor was then alternately evacuated and purged with $N_2$ until $O_2$ level is less than 50 ppm. The reactor was then evacuated, the temperature raised to 71° C., and the agitation set at 445 rpm. Next, the reactor was charged with 414 g of TFE and 11.2 g of propylene to give a pressure of 1.59 MPa (230 psig). The polymerization was initiated by feeding a 5% solution of $(NH_4)_2S_2O_8$ in deionized water to the reactor by means of a metering pump approximately 14 g/min until 1 equivalent of $(NH_4)_2S_2O_8$ was fed (approximately 370 g of soln.). No pressure drop, which would indicate the onset of polymerization, was observed.

Comparative Example C3

Figure 4:
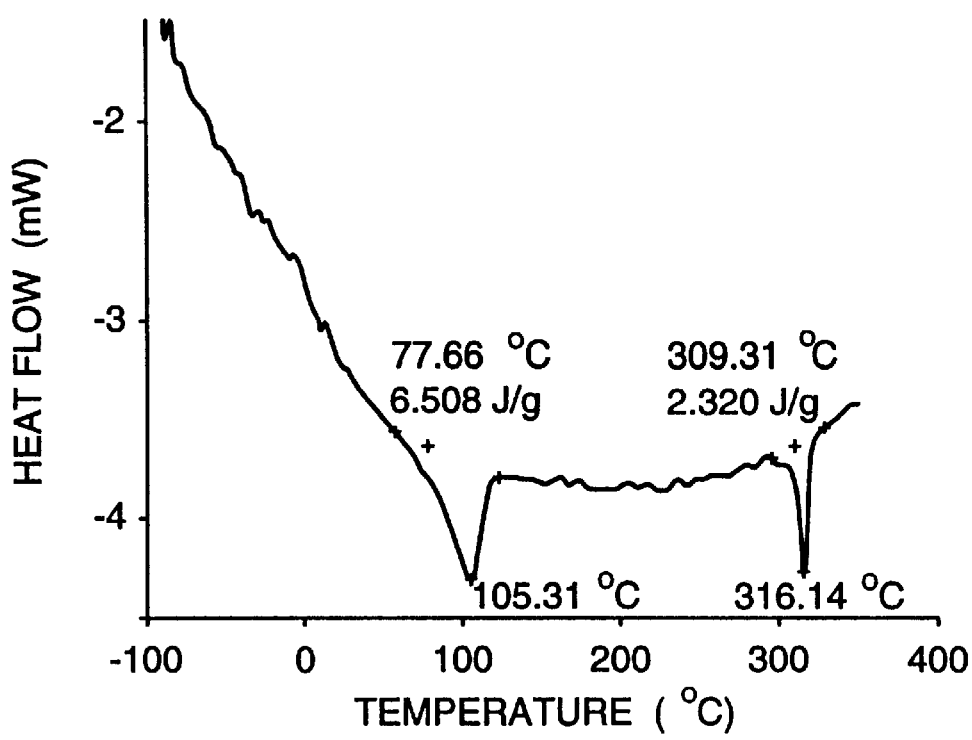

Following the procedure of example 6 of U.S. Pat. No. 3,933,733, supra, an 86-liter vertically-stirred polymerization reactor was charged with 60,000 g deionized water, 300 g NaOH, 300 g ammonium perfluoro octanoate, and 12 g $Na_2SO_3$. The reactor was then alternately evacuated and purged with $N_2$ until $O_2$ level is less than 50 ppm. The reactor was then evacuated, the temperature raised to 60° C., and the agitation set at 150 rpm. Next, the reactor was charged with 2100 g of TFE and 46.5 g of propylene to give a pressure of 1.72 MPa (250 psig). The polymerization was initiated by feeding a 5.7% solution of $(NH_4)_2S_2O_8$ in deionized water to the reactor by means of a metering pump at maximum pump speed (approximately 100 g/min) until 432 g of soln. was fed. Upon the observation of a pressure drop, the running feed, which consisted of 88% TFE and 12% propylene, was started and continuously adjusted by the reactor's control system in order to maintain the desired pressure. The polymerization was halted after 6 hours by slowing the agitation to 50 rpm, during which time 3,458 g of TFE and 489.5 g of propylene had been fed to give a calculated average reaction rate of 11 g/l-h. The reactor was then vented, cooled, and drained to isolate the 6% solids latex. The resulting polymer was isolated by freeze coagulation, washed six times with deionized water, and dried overnight in an oven at 100° C. The polymer, when analyzed by DSC, exhibited two melting transitions with peak melting temperatures of 105° C. and 316° C. (see FIG. 4). Integration of the large and small melt-peaks shows that 26% of the total heat of fusion is attributable to the 316° C. peak (See FIG. 4). Elemental analysis of the polymer for carbon, hydrogen, and fluorine, indicated a polymer composition of 88.1% TFE and 11.9% propylene. The Melt Flow Index (MFI) of the polymer was determined to be zero g/10 min @ 265° C. and 15 kg applied load.

Comparative Example C4

Figure 5:
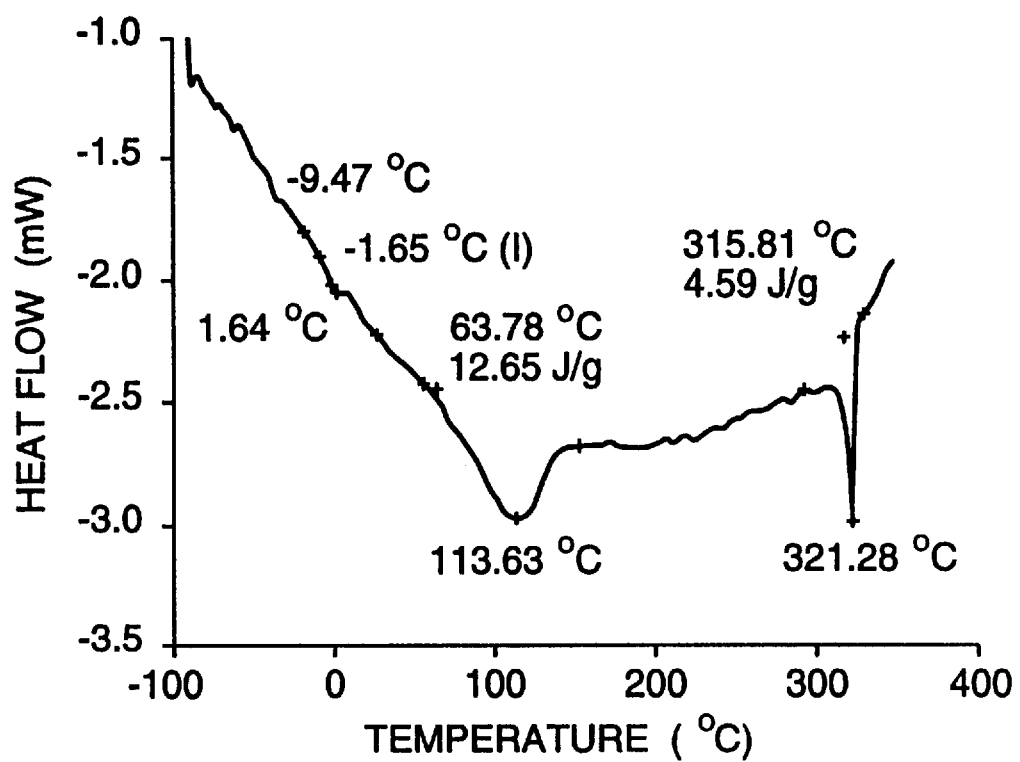

Following the procedure described in U.S. Pat. No. 4,463, 144, supra, except using ammonium perfluoro octanoate as the emulsifier, an 86-liter vertically-stirred polymerization reactor was charged with 51,600 g deionized water, 5,600 g t-butanol, 281 g ammonium perfluoro octanoate, 167 g KOH, 857 g $K_2HPO_4$, 3.4 g $Na_2EDTA$, and 2.8 g $FeSO_4.7H_2O$. The reactor was then alternately evacuated and purged with $N_2$ until $O_2$ level is less than 50 ppm. The reactor was then evacuated, the temperature raised to 27° C., and the agitation set at 130 rpm. Next, the reactor was charged with 2170 g of TFE and 64.1 g of propylene to give a pressure of 1.52 MPa (220 psig). The polymerization was initiated by feeding a solution consisting of 175 g $^+Na^-SO_2CH_2OH$, 15 g $Na_2EDTA$, and 18.4 g KOH in 1810 g of deionized water, to the reactor by means of a metering pump (approximately 3 g/min) until 950 g of soln. was fed. Upon the observation of a pressure drop, the running feed, which consisted of 88% TFE and 12% propylene, was started and continuously adjusted by the reactor's control system in order to maintain the desired pressure. The polymerization halted after 8,479 g of TFE and 1,173 g of propylene had been fed, 5.5 hours after start of running feed to give a calculated average reaction rate of 30 g/l-h. The reactor was then vented, cooled, and drained to isolate the polymer suspension. The resulting polymer was isolated by filtration, washed six times with hot deionized water, and dried overnight in an oven at 100° C. The polymer, when analyzed by DSC, exhibited two melting transitions with peak melting temperatures of 114° C. and 321° C. (see FIG. 5). Integration of the large and small melt-peaks shows that 27% of the total heat of fusion is attributable to the 321° C. peak (see FIG. 4). Elemental analysis of the polymer for carbon, hydrogen, and fluorine, indicated a polymer composition of 88.8% TFE and 11.2% propylene. The Melt Flow Index (MFI) of the polymer was determined to be 59 g/10 min @ 265° C. and 5 kg applied load.

Examples 6–8 and Comparative Examples C2 and C3 show that unlike the semi-crystalline polymers of the prior art, the semi-crystalline polymers of this invention have very little if any melt transitions above 300° C. It is believed that the improved melt-processing of semi-crystalline polymers of this invention is due in part to the absence of significant melt-transitions above 300° C.

FT-IR spectra of thin films of the resulting polymers showed no observable carbonyl absorptions for Examples 6–9, a relatively large carbonyl absorption at 1695 cm$^{-1}$ for Comparative Example C2, and a moderate carbonyl absorption at 1744 cm$^{-1}$ for Comparative Example C3. This indicates that the polymers of this invention do not contain significant amounts of carbonyl-containing end-groups.

Various modifications and alterations of this invention will be apparent to those skilled in the art without departing from the scope and spirit of this invention and this invention should not be restricted to that set forth herein for illustrative purposes.

What is claimed is:

1. A method for the preparation of fluorine-containing polymer comprising, polymerizing at temperatures above about 50° C., under free-radical conditions, an aqueous emulsion or suspension of a polymerizable mixture comprising a fluorine-containing ethylenically-unsaturated monomer, an allylic-hydrogen containing olefin monomer, a fluoroaliphatic-group containing sulfinate, and an oxidizing agent capable of oxidizing said sulfinate to a sulfonyl radical.

2. The method of claim 1 wherein said fluorine-containing monomer is selected from the group consisting of vinylidene fluoride, hexafluoropropylene, chlorotrifluoroethylene, 1-chloropentafluoropropene, perfluoroalkyl vinyl ethers, tetrafluoroethylene, 1-hydropentafluoropropene, dichlorodifluoroethylene, 2-hydropentafluoropropene, vinyl fluoride, trifluoroethylene, 1,1-dichlorofluoroethylene, perfluorodiallylether, and perfluoro-1,3-dioxoles.

3. The method of claim 1 wherein said allylic-hydrogen containing olefin monomer is a mono-olefin consisting of carbon, hydrogen, and halogen atoms.

4. The method of claim 1 wherein said allylic-hydrogen containing olefin monomer is selected from the group consisting of propylene, butylene, isobutylene, and 1,1,2-trifluoropropene.

5. The method of claim 1 wherein said oxidizing agent is water-soluble.

6. The method of claim 1 wherein said fluorine-containing monomer is tetrafluoroethylene.

7. The method of claim 1 wherein said sulfinate is $R_f(SO_2M_{1/x})_n$ where $R_f$ is a fluoroaliphatic group, M is a hydrogen atom or a cation of valence x, and n is 1 or 2.

8. The method of claim 1 wherein said polymer is amorphous.

9. The method of claim 1 wherein the mixture of monomers in said polymerizable mixture consists essentially of ethylenically-unsaturated monomers.

10. The method of claim 1 wherein the mixture of monomers in said polymerizable mixture consists essentially of monomers selected from the group consisting of tetrafluoroethylene, vinylidene fluoride, and propylene.

* * * * *